United States Patent
Colont et al.

(10) Patent No.: US 11,067,131 B2
(45) Date of Patent: Jul. 20, 2021

(54) ANTI-ROTATION ASSEMBLY AND BEARING HOUSING ASSEMBLY INCLUDING THE SAME

(71) Applicant: BORGWARNER INC., Auburn Hills, MI (US)

(72) Inventors: Craig Andrew Colont, Candler, NC (US); Timothy Mark House, Mills River, NC (US)

(73) Assignee: Borg Warner Inc., Auburn Hills, MI (US)

( * ) Notice: Subject to any disclaimer, the term of this patent is extended or adjusted under 35 U.S.C. 154(b) by 151 days.

(21) Appl. No.: 16/002,338

(22) Filed: Jun. 7, 2018

(65) Prior Publication Data

US 2019/0376560 A1    Dec. 12, 2019

(51) Int. Cl.
    *F16C 35/04* (2006.01)
    *F01D 25/16* (2006.01)
    *F16C 19/16* (2006.01)

(52) U.S. Cl.
    CPC .......... *F16C 35/042* (2013.01); *F01D 25/162* (2013.01); *F16C 19/16* (2013.01);
    (Continued)

(58) Field of Classification Search
    None
    See application file for complete search history.

(56) References Cited

U.S. PATENT DOCUMENTS

| | | | | |
|---|---|---|---|---|
| 2,897,022 A | * | 7/1959 | Marola | F16C 35/063 384/584 |
| 3,985,458 A | * | 10/1976 | Snyder, Jr. | F16D 1/0823 403/111 |

(Continued)

FOREIGN PATENT DOCUMENTS

| | | |
|---|---|---|
| DE | 102012206304 A1 | 10/2013 |
| DE | 102015220384 A1 * | 4/2017 ............ F16C 35/067 |

(Continued)

OTHER PUBLICATIONS

Machine-assisted English language abstract and machine-assisted English translation for DE 10 2015 220 384 extracted from espacenet. com database on Jun. 25, 2018, 19 pages.
(Continued)

*Primary Examiner* — Peter J Bertheaud
*Assistant Examiner* — Geoffrey S Lee
(74) *Attorney, Agent, or Firm* — Howard & Howard Attorneys PLLC

(57) ABSTRACT

A turbocharger includes a turbine housing defining a turbine housing interior, a turbine wheel disposed in the turbine housing interior, a compressor housing defining a compressor housing interior, a compressor wheel disposed in the compressor housing interior, and a shaft coupled to the compressor wheel and the turbine wheel. The turbocharger also includes a bearing housing assembly including a bearing housing defining a bearing housing interior, and an anti-rotation assembly. The anti-rotation assembly includes a bearing assembly disposed in the bearing housing interior, an anti-rotation spacer disposed in the bearing housing interior and about the shaft, and a retaining ring disposed about the shaft and coupled to the anti-rotation spacer to axially retain the anti-rotation spacer in the bearing housing interior. The anti-rotation spacer has an engagement member engageable with the retaining ring and configured to limit rotation of the retaining ring relative to the anti-rotation spacer.

20 Claims, 16 Drawing Sheets

(52) U.S. Cl.
CPC ...... *F05D 2220/40* (2013.01); *F05D 2240/14* (2013.01); *F05D 2240/50* (2013.01); *F16C 2360/24* (2013.01)

(56) References Cited

U.S. PATENT DOCUMENTS

| | | | | |
|---|---|---|---|---|
| 4,522,515 A * | 6/1985 | Miki | ................ | F16C 19/386 |
| | | | | 384/571 |
| 4,557,679 A * | 12/1985 | Mori | ................ | F01C 21/02 |
| | | | | 384/542 |
| 4,721,441 A * | 1/1988 | Miyashita | ............. | F01D 25/164 |
| | | | | 384/518 |
| 4,838,711 A * | 6/1989 | Munkel | ................ | F16C 17/02 |
| | | | | 384/215 |
| 5,207,566 A * | 5/1993 | Munkel | ................ | F01D 25/164 |
| | | | | 417/407 |
| 6,409,390 B1 * | 6/2002 | Bouzakis | ............. | F16C 25/083 |
| | | | | 384/517 |
| 6,626,574 B2 * | 9/2003 | Bos | ................ | F16C 27/045 |
| | | | | 384/535 |
| 7,214,037 B2 | 5/2007 | Mavrosakis | | |
| 8,764,384 B2 | 7/2014 | Dullack et al. | | |
| 8,843,046 B2 * | 9/2014 | Nawa | ................ | G03G 15/2053 |
| | | | | 399/330 |
| 8,961,128 B2 * | 2/2015 | Mavrosakis | .......... | F01D 25/162 |
| | | | | 415/229 |
| 9,068,598 B2 | 6/2015 | House et al. | | |
| 9,581,044 B2 | 2/2017 | House et al. | | |
| 9,745,992 B2 | 8/2017 | Barber et al. | | |
| 9,752,536 B2 | 9/2017 | Annati et al. | | |
| 2005/0287018 A1 * | 12/2005 | Mavrosakis | .......... | F16C 27/045 |
| | | | | 417/407 |
| 2011/0052429 A1 * | 3/2011 | Marsal | ................ | F16C 35/067 |
| | | | | 417/407 |
| 2014/0265685 A1 | 9/2014 | Scott | | |
| 2014/0369865 A1 | 12/2014 | Marsal et al. | | |
| 2015/0192066 A1 | 7/2015 | Koch | | |
| 2016/0177784 A1 | 6/2016 | Archer et al. | | |
| 2016/0245303 A1 | 8/2016 | Chekansky | | |
| 2017/0191377 A1 | 7/2017 | Longacre | | |
| 2017/0254351 A1 * | 9/2017 | Rooks | ................ | F16B 21/18 |
| 2018/0238383 A1 * | 8/2018 | Nambu | ................ | F16C 35/02 |

FOREIGN PATENT DOCUMENTS

| | | |
|---|---|---|
| DE | 102015220384 A1 | 4/2017 |
| DE | 102016209149 A1 | 7/2017 |
| EP | 3144497 A1 | 3/2017 |
| WO | 2016079543 A1 | 5/2016 |
| WO | 2017097294 A1 | 6/2017 |

OTHER PUBLICATIONS

Machine-assisted English language abstract and machine-assisted English translation for DE 10 2016 209 149 extracted from espacenet.com database on Jun. 25, 2018, 35 pages.

English language abstract and machine-assisted English translation for WO 2017/097294 extracted from espacenet.com database on Jun. 25, 2018, 15 pages.

English language abstract and machine-assisted English translation for DE 10 2012 206 304 extracted from espacenet.com database on Nov. 2019, 8 pages.

* cited by examiner

ANTI-ROTATION ASSEMBLY AND BEARING HOUSING ASSEMBLY INCLUDING THE SAME

BACKGROUND OF THE INVENTION

1. Field of the Invention

The present invention generally relates to a bearing housing assembly and, more specifically, to an anti-rotation assembly for use in the bearing housing assembly.

2. Description of the Related Art

Turbochargers receive exhaust gas from an internal combustion engine of a vehicle and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in the vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior and a turbine wheel disposed in the turbine housing interior. Turbochargers further include a compressor housing coupled to the bearing housing and defining a compressor housing interior, and include a compressor wheel disposed in the compressor housing interior. Turbochargers also include a shaft disposed in the turbine housing interior and the compressor housing interior, with the shaft extending along the longitudinal axis and coupled to and rotatable with the turbine wheel and the compressor wheel. Specifically, the exhaust gas from the internal combustion engine, which would normally contain wasted energy, is used to drive the turbine wheel, which is used to drive the shaft and, in turn, the compressor wheel to deliver compressed air to the internal combustion engine.

Turbochargers also include a bearing housing assembly including a bearing housing extending along a longitudinal axis, coupled to the turbine housing and to the compressor housing, and defining a bearing housing interior and a lubricant sump. Bearing housing assemblies in typical turbochargers also include a bearing assembly disposed in the bearing housing interior and disposed about the shaft for supporting rotation of the shaft. The bearing assembly typically rotates independently from the bearing housing. In other words, the bearing assembly and the bearing housing are not rotatably coupled to one another such that the bearing housing and the bearing housing assembly may rotate independently of one another.

Bearing housing assemblies in typical turbochargers additionally include a retaining ring disposed about the shaft and coupled to the bearing housing to axially retain the bearing assembly in the bearing housing interior. Some turbochargers may include a lubricant deflector disposed in and coupled to the bearing housing to deflect lubricant toward the lubricant sump defined by the bearing housing.

Turbochargers require clocking upon installation in the vehicle. During installation, the compressor housing and the turbine housing are rotationally fixed along the longitudinal axis relative to the vehicle. In contrast to the compressor housing and the turbine housing, the bearing housing requires rotation about the longitudinal axis to align the lubricant sump with the ground beneath the vehicle. This alignment is necessary to facilitate flow of lubricant through the turbocharger, as lubricant is only subject to gravitational forces and is not under pressure in turbochargers.

The bearing assembly, the retaining ring, and the lubricant deflector of typical bearing housing assemblies do not rotate with the bearing housing during rotation and alignment of the bearing housing when clocking the turbocharger in the vehicle. The bearing assembly, the retaining ring, and the lubricant deflector, therefore, are unable remain in rotational position relative to one another and relative to the bearing housing during clocking of the turbocharger. In particular, the retaining ring and the lubricant deflector in turbochargers are unable to remain aligned with the lubricant sump during rotation and alignment of the bearing housing. Therefore, the retaining ring and the lubricant deflector are unable to direct lubricant toward the lubricant sump of the bearing housing, resulting in an undesired accumulation of lubricant in the bearing housing.

As such, there remains a need to provide for an improved bearing housing assembly that rotationally fixes internal components of the bearing housing during rotation and alignment of the bearing housing when clocking the turbocharger in the vehicle.

SUMMARY OF THE INVENTION AND ADVANTAGES

A turbocharger includes a turbine housing defining a turbine housing interior, and a turbine wheel disposed in the turbine housing interior. The turbocharger also includes a compressor housing defining a compressor housing interior, and a compressor wheel disposed in the compressor housing interior. The turbocharger further includes a shaft disposed in the turbine housing interior and the compressor housing interior. The shaft extends along a longitudinal axis and is coupled to and rotatable with the turbine wheel and the compressor wheel about the longitudinal axis. The turbocharger further includes a bearing housing assembly including a bearing housing extending along the longitudinal axis and having an interior surface defining a bearing housing interior. The bearing housing assembly also includes an anti-rotation assembly. The anti-rotation assembly includes a bearing assembly disposed in the bearing housing interior and disposed about the shaft, with the bearing assembly supporting rotation of the shaft. The anti-rotation assembly also includes an anti-rotation spacer disposed in the bearing housing interior and disposed about the shaft. The anti-rotation assembly also includes a retaining ring disposed about the shaft and coupled to the anti-rotation spacer to axially retain the anti-rotation spacer in the bearing housing interior. The anti-rotation spacer has an engagement member engageable with the retaining ring and configured to limit rotation of the retaining ring relative to the anti-rotation spacer.

Accordingly, the engagement member of the anti-rotation spacer rotationally fixes the anti-rotation spacer relative to the retaining ring, which allows quicker alignment of the bearing housing during clocking of the turbocharger in a vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
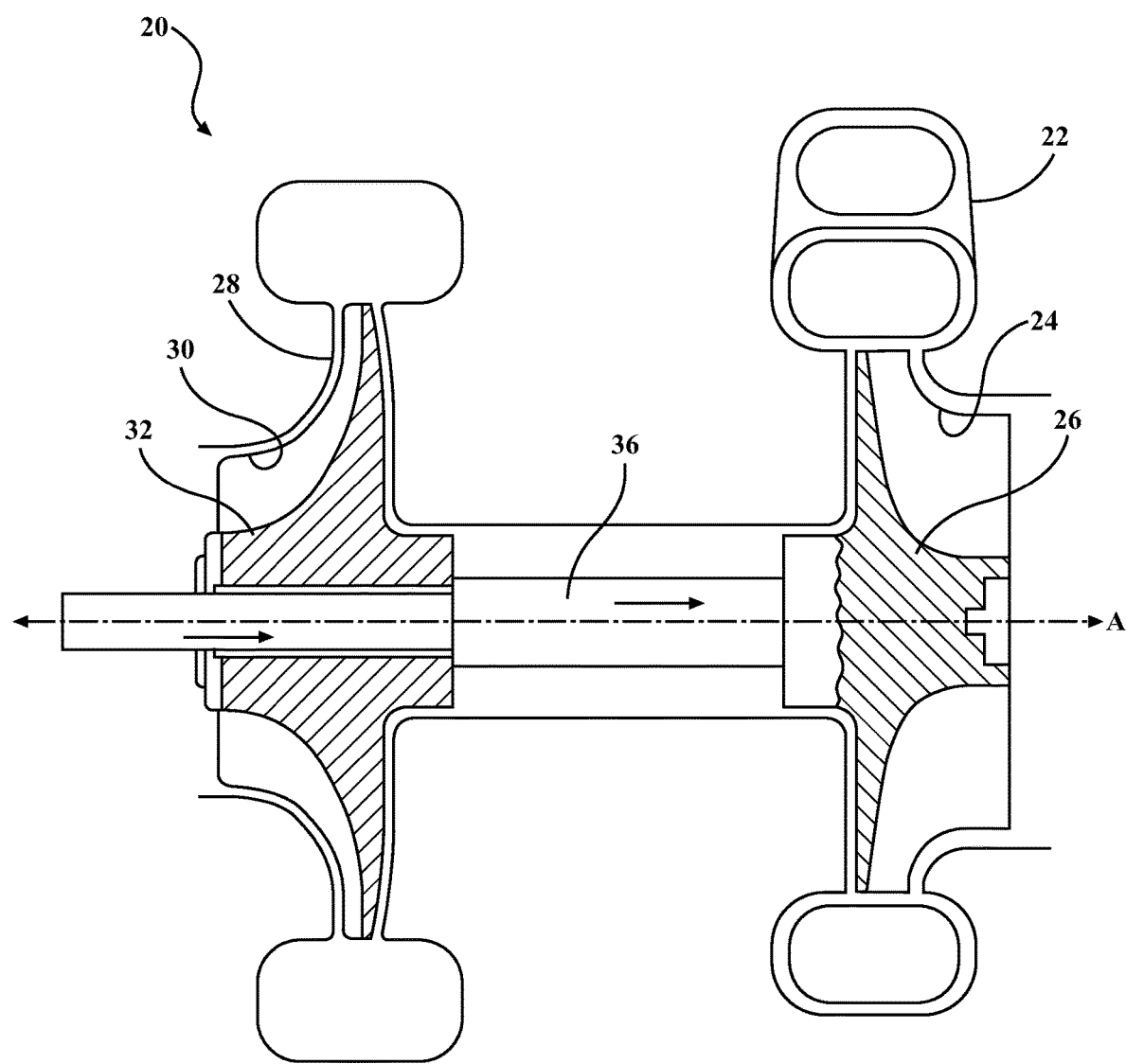
FIG. 1 is a schematic illustration of a turbocharger including a turbine housing defining a turbine housing interior, a turbine wheel disposed in the turbine housing interior, a compressor housing defining a compressor housing interior, a compressor wheel disposed in the compressor housing interior, and a bearing housing assembly including a bearing housing and a shaft.
Figure 2:
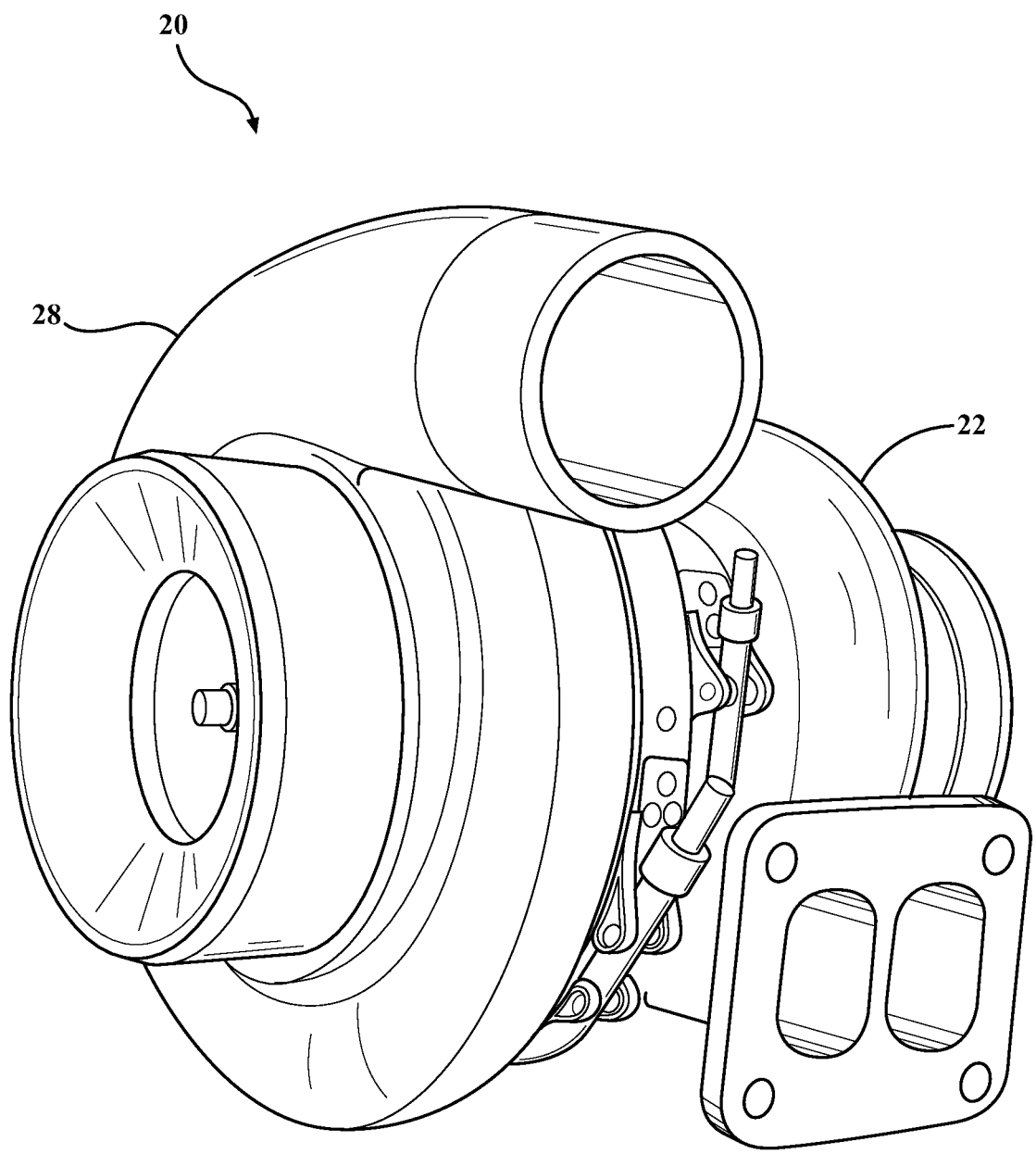
FIG. 2 is a perspective view of the turbocharger, with the bearing housing removed.
Figure 3:
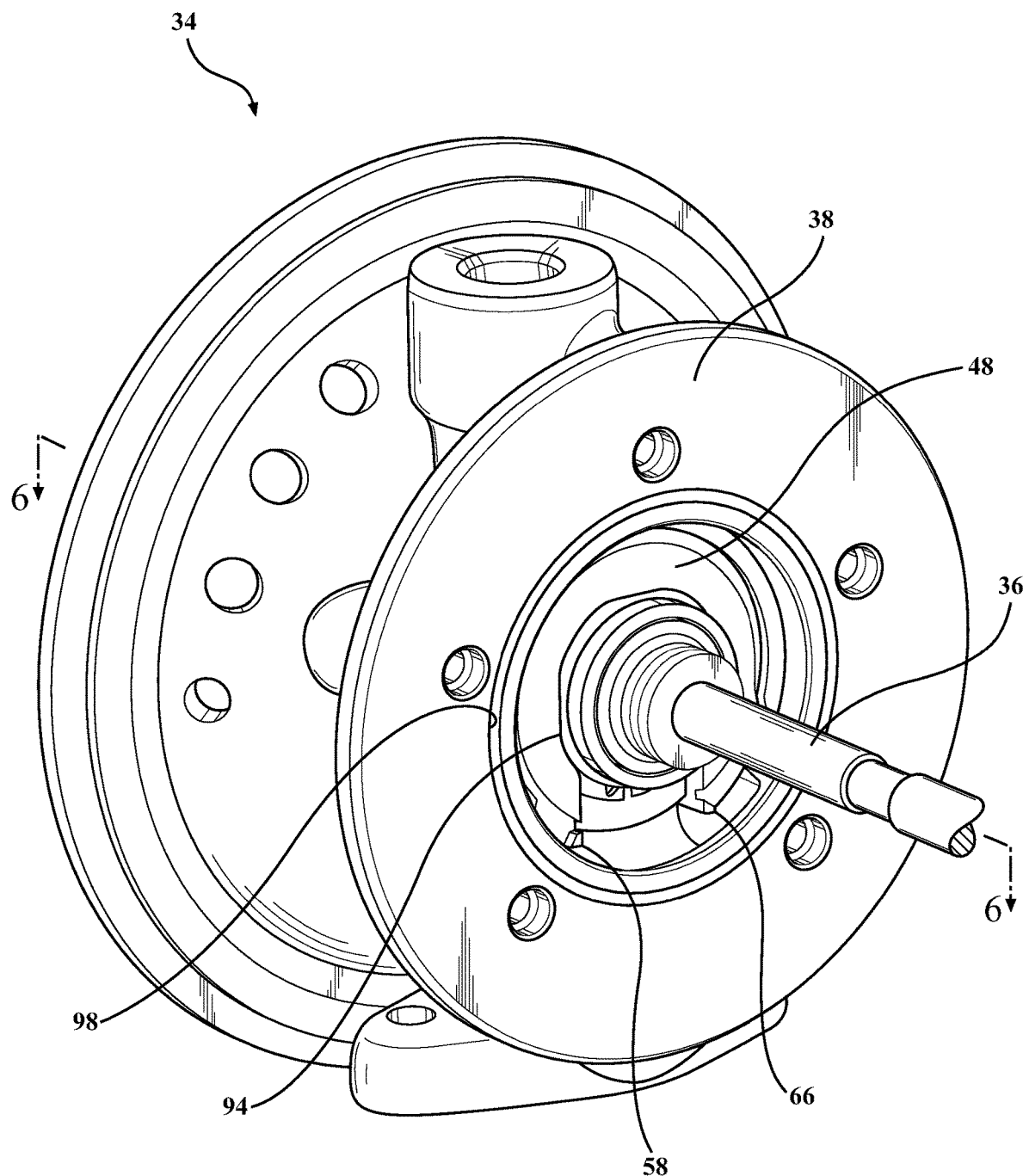
FIG. 3 is a perspective view of the bearing housing assembly including the bearing housing defining a bearing housing interior, the shaft disposed in the bearing housing interior, and an anti-rotation assembly, with the anti-rotation assembly including a bearing assembly disposed in the bearing housing interior, an anti-rotation spacer disposed in the bearing housing interior and which has a first engagement member, and a retaining ring coupled to the anti-rotation spacer.

With reference to the figures, wherein like numerals indicate like parts throughout the several views, a turbocharger 20 is shown schematically in FIG. 1 and in perspective view in FIG. 2. The turbocharger 20 receives exhaust gas from an internal combustion engine and delivers compressed air to the internal combustion engine. The turbocharger 20 includes a turbine housing 22 defining a turbine housing interior 24 which receives exhaust gas from the internal combustion engine. The turbocharger 20 includes a turbine wheel 26 disposed in the turbine housing interior 24 for receiving the exhaust gas from the internal combustion engine. Specifically, the exhaust gas from the internal combustion engine is used to drive the turbine wheel 26. The turbocharger 20 additionally includes a compressor housing 28 defining a compressor housing interior 30. The compressor housing interior 30 receives and directs air to the internal combustion engine. The turbocharger 20 includes a compressor wheel 32 disposed in the compressor housing interior 30.

The turbocharger 20 also includes a shaft 36 coupled to and rotatable by the turbine wheel 26, with the shaft 36 extending along a longitudinal axis A. Specifically, the turbine wheel 26 is driven by the exhaust gas from the internal combustion engine, which, in turn, rotates the shaft 36. The shaft 36 is also coupled to the compressor wheel 32. The compressor wheel 32 is rotatable by the shaft 36 for delivering compressed air to the internal combustion engine.

Figure 4:
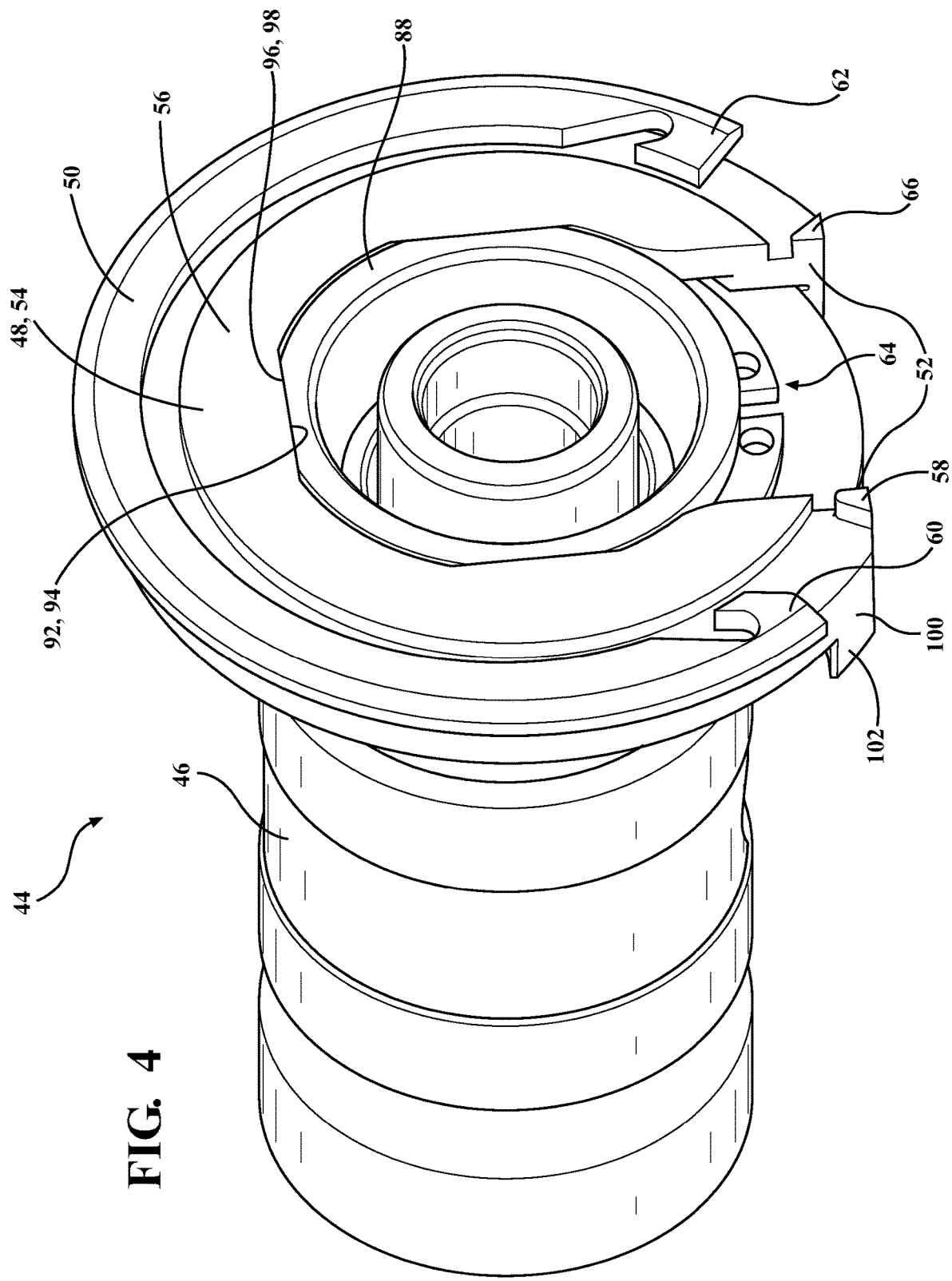
FIG. 4 is a perspective view of the anti-rotation assembly.
Figure 5:
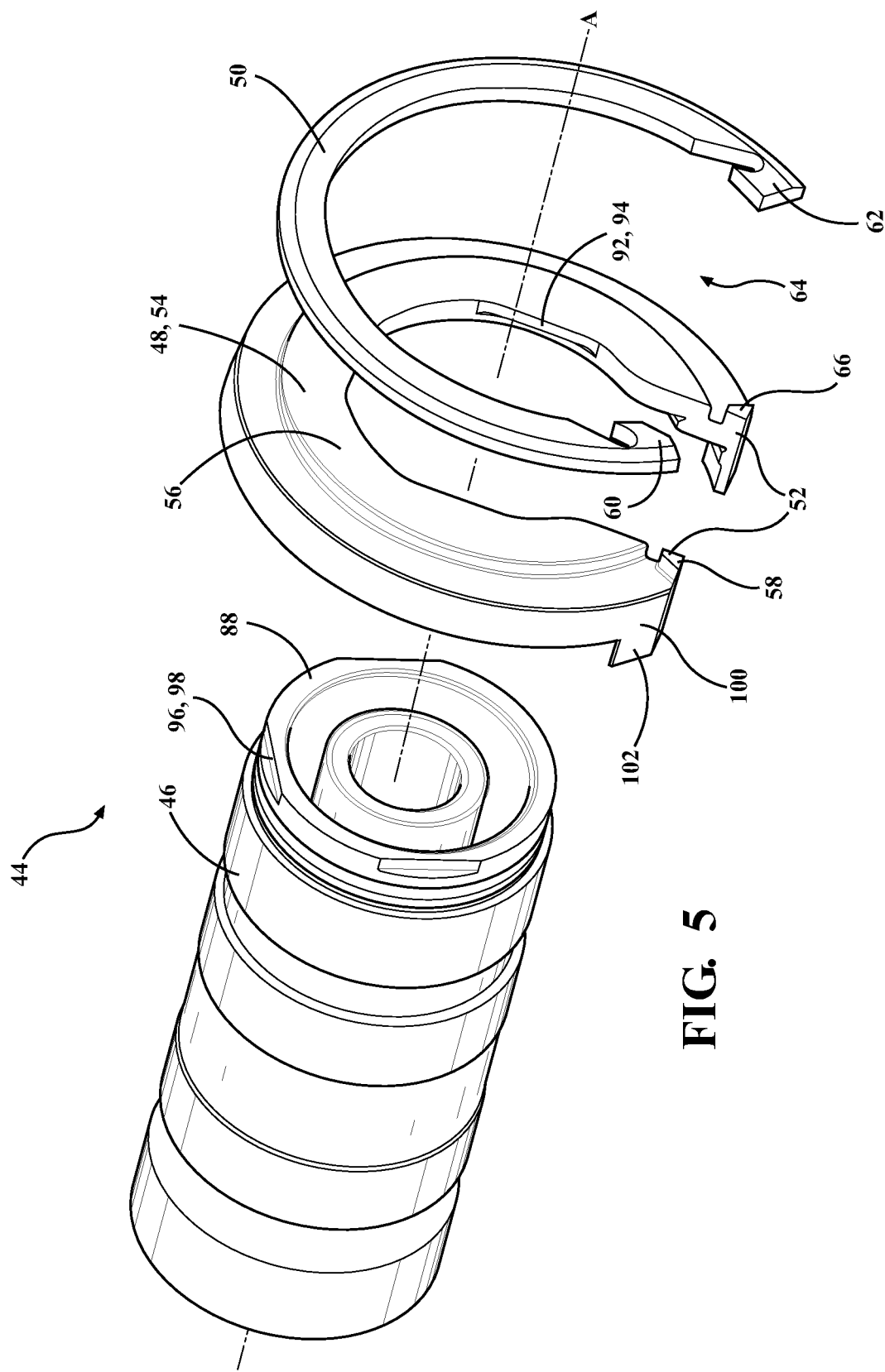
FIG. 5 is an exploded view of the anti-rotation assembly, with the bearing assembly including an outer race.

With reference to FIGS. 3, 6-15, the turbocharger 20 also includes a bearing housing assembly 34 including a bearing housing 38 extending along the longitudinal axis A, having an interior surface 40 defining a bearing housing interior 42, and configured to receive the shaft 36. The bearing housing assembly 34 also includes an anti-rotation assembly 44, as shown in FIGS. 4 and 5. The anti-rotation assembly 44 includes a bearing assembly 46 disposed in the bearing housing interior 42 and configured to be disposed about the shaft 36 for supporting rotation of the shaft 36. Typically, the bearing assembly 46 is coupled to the shaft 36. In some embodiments, the bearing assembly 46 is directly engaged with the shaft 36. The anti-rotation assembly 44 further includes an anti-rotation spacer 48 disposed in the bearing housing interior 42 and configured to be disposed about the shaft 36. The anti-rotation spacer 48 may also be coupled to the bearing housing 38. The anti-rotation assembly 48 additionally includes a retaining ring 50 disposed about the shaft 36 and coupled to the anti-rotation spacer 48 to axially retain the anti-rotation spacer 48 in the bearing housing interior 42. The retaining ring 50 may apply a compressive force to the anti-rotation spacer 48 to maintain contact between the anti-rotation spacer 48 and the bearing assembly 46. Additionally, the retaining ring 50 may have an interior diameter that is smaller than an exterior diameter of the bearing assembly 46 such that the bearing assembly 46 is axially retained in the bearing housing interior 42. The retaining ring 50 may also be directly engaged with the anti-rotation spacer 48. The anti-rotation spacer 48 has an engagement member 52 engageable with the retaining ring 50 and configured to limit rotation of the retaining ring 50 relative to the anti-rotation spacer 48. In one embodiment, the anti-rotation spacer 48 has a spacer body portion 54 extending along the longitudinal axis A and the engagement member 52 may be configured to be engaged with the retaining ring 50 to limit rotation of the retaining ring 50 relative to the spacer body portion 54.

The anti-rotation spacer 48 having the engagement member 52 rotationally fixes the anti-rotation spacer 48 relative to the retaining ring 50. Having the anti-rotation spacer 48 rotationally fixed to the retaining ring 50 assists in alignment of the bearing housing 38 during clocking of the turbocharger 20 in a vehicle. In one embodiment, the anti-rotation spacer 48 having the engagement member 52 engageable with the retaining ring 50 allows quicker alignment of the bearing housing 38 during clocking of the turbocharger 20 in the vehicle. Specifically, when the bearing housing 38 is coupled to the turbine housing 22 and the compressor housing 28 during rotation and alignment of the bearing housing 38 and clocking of the turbocharger 20, the anti-rotation spacer 48 engages the retaining ring 50 to limit rotation of the retaining ring 50 relative to the anti-rotation spacer 48 as the bearing housing 38 is rotated relative the turbine housing 22 and/or to the compressor housing 28.

In one embodiment, as best shown in FIGS. 3-5, and 9-11, the engagement member 52 has a protruding portion 58 extending toward and engageable with the retaining ring 50 to limit rotation of the retaining ring 50 relative to the anti-rotation spacer 48. The anti-rotation spacer 48 may have a spacer surface 56 perpendicular to the longitudinal axis A and facing the retaining ring 50, and the protruding portion 58 may extend from the spacer surface 56 axially with respect to the longitudinal axis A toward the retaining ring 50 to limit rotation of the retaining ring 50 relative to the anti-rotation spacer 48. Specifically, to limit rotation of the retaining ring 50 relative to the anti-rotation spacer 48, the protruding portion 58 is engageable with the retaining ring 50. It is to be appreciated that the protruding portion 58 may extend from other portions of the anti-rotation spacer 48, such as radially away from the longitudinal axis A toward the retaining ring 50, while still limiting rotation of the retaining ring 50 relative to the anti-rotation spacer 48.

With reference to FIGS. 4, 5, and 8-12, the retaining ring 50 may have a first end 60 and a second end 62 circumferentially spaced from the first end 60, with the first and second ends 60, 62 defining a gap 64 therebetween. When present, the gap 64 has a width W defined between the first and second ends 60, 62. The protruding portion 58 may be engageable with at least one of the first and second ends 60, 62 of the retaining ring 50 to limit rotation of the retaining ring 50 relative to the anti-rotation spacer 48. It is to be appreciated that either the first end 60 or the second end 62 may be engaged by the protruding portion 58 to limit rotation of the retaining ring 50 relative to the anti-rotation spacer 48. It is also to be appreciated that the both the first end 60 and the second end 62 may be engaged by the protruding portion 58 to limit rotation of the retaining ring 50 relative to the anti-rotation spacer 48.

In some embodiments, the protruding portion 58 of the engagement member 52 may be further defined as a first protruding portion 58, and the engagement member 52 may further have a second protruding portion 66 extending toward and engageable with the retaining ring 50. In such embodiments, the first protruding portion 58 may be engageable with the first end 60 of the retaining ring 50 and the second protruding portion 66 may be engageable with the second end 62 of the retaining ring 50 to limit rotation of the retaining ring 50 relative to the anti-rotation spacer 48.

In another embodiment, as best shown in FIGS. 12-16, the engagement member 52 has an engagement surface 68 and the retaining ring 50 has a retaining ring protruding portion 70 extending toward and engageable with the engagement surface 68 to limit rotation of the retaining ring 50 relative to the anti-rotation spacer 48. The retaining ring 50 may have a retaining surface 72 perpendicular to the longitudinal axis A and facing the anti-rotation spacer 48, and the retaining ring protruding portion 70 may extend from the retaining surface 72 axially with respect to the longitudinal axis A toward the engagement surface 68 of the anti-rotation spacer 48 to limit rotation of the retaining ring 50 relative to the anti-rotation spacer 48. Specifically, to limit rotation of the retaining ring 50 relative to the anti-rotation spacer 48, the retaining ring protruding portion 70 is engageable with the engagement surface 68 of the anti-rotation spacer 48. It is to be appreciated that the retaining ring protruding portion 70 may extend from other portions of the retaining ring 50, such as radially away from the longitudinal axis A toward the engagement surface 68 of the anti-rotation spacer 48, while still limiting rotation of the retaining ring 50 relative to the anti-rotation spacer 48.

With reference to FIGS. 12-16, the retaining ring protruding portion 70 may extend from at least one of the first and second ends 60, 62 of the retaining ring 50 and may be engageable with the engagement surface 68 of the anti-rotation spacer 48 to limit rotation of the retaining ring 50 relative to the anti-rotation spacer 48. It is to be appreciated that the retaining ring protruding portion 70 may extend from either the first end 60 or the second end 62, and toward the engagement surface 68 to engage the engagement surface 68 and limit rotation of the retaining ring 50 relative to the anti-rotation spacer 48. It is also to be appreciated that the retaining ring protruding portion 70 may extend from both the first end 60 and the second end 62 and toward the engagement surface 68 to engage the engagement surface 68 and limit rotation of the retaining ring 50 relative to the anti-rotation spacer 48.

Figure 13:
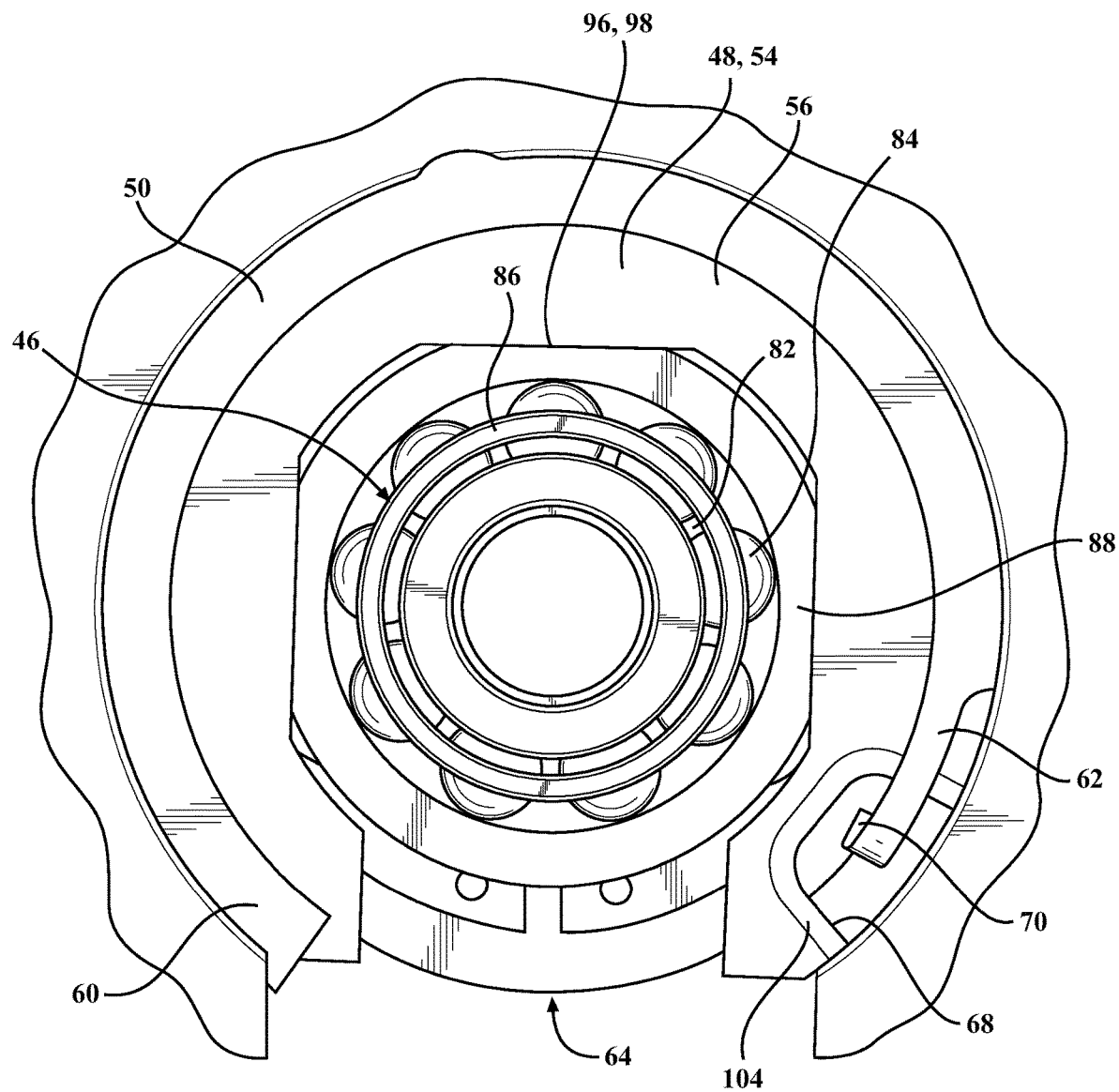
FIG. 13 is a front view of the bearing housing assembly, with the engagement member of the anti-rotation spacer having a recessed portion defined by the engagement surface, and with the retaining ring having the first end and the second end defining a gap therebetween, with the retaining ring having a retaining ring protruding portion extending from at least one of the first end and the second end of the retaining ring and toward the engagement surface defining the recessed portion.
Figure 16:
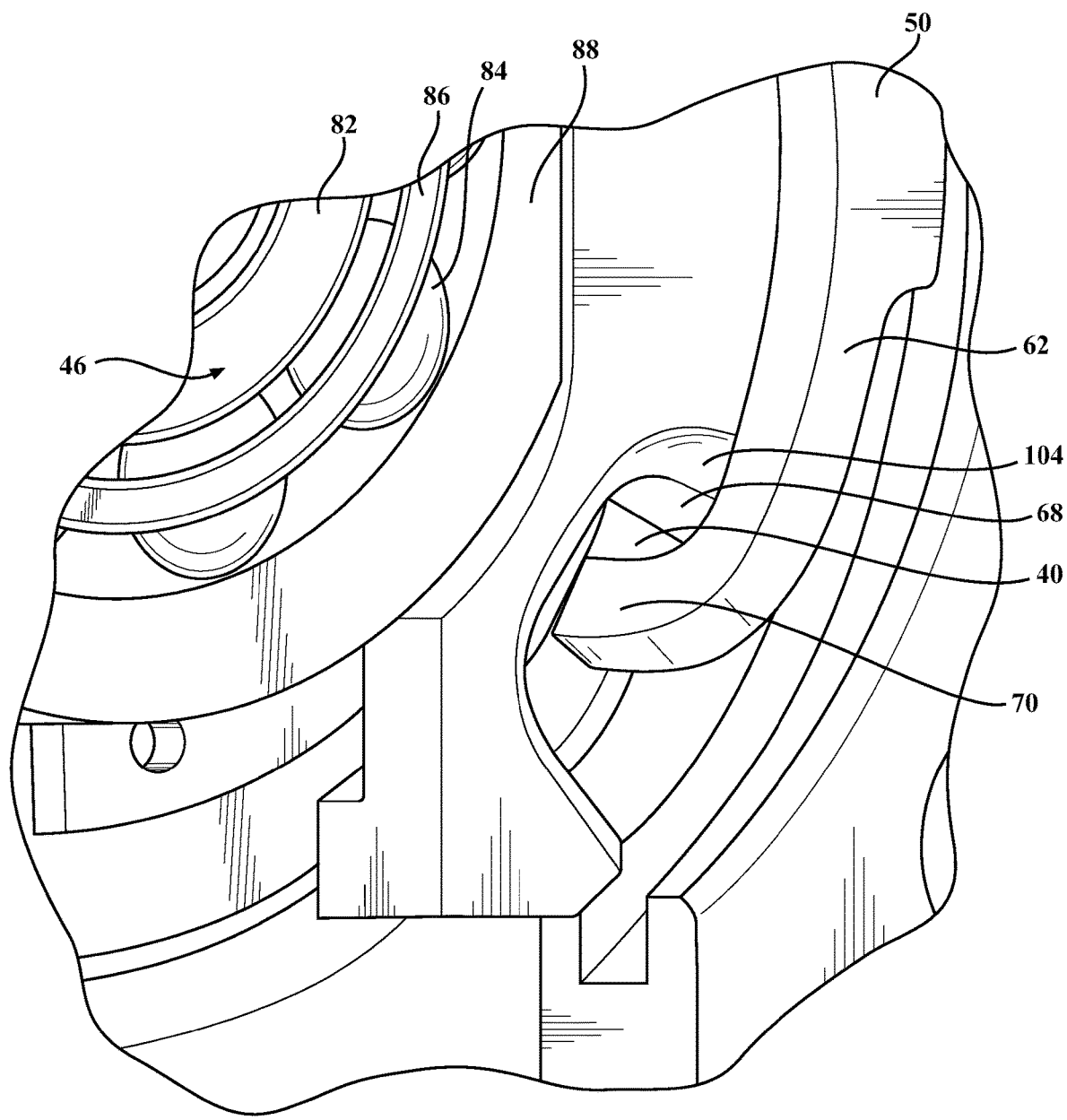
FIG. 16 is a perspective view of the bearing housing assembly, with the retaining ring protruding portion extending through the recessed portion of the anti-rotation spacer, and with the retaining ring protruding portion engaged with the bearing housing.

With reference to FIGS. 13 and 16, the anti-rotation spacer 48 may have a recessed portion 104 defined by the engagement surface 68, with the recessed portion 104 being configured to receive the retaining ring protruding portion 70. The recessed portion 104 of the anti-rotation spacer 48 may be defined completely through the anti-rotation spacer 48, such as a slot, partially defined through the anti-rotation spacer 48, such as an indentation, or any other geometry configured to receive the retaining ring protruding portion 70. The retaining ring protruding portion 70 may extend only partially into the recessed portion 104, or completely into the recessed portion 104 when the recessed portion 104 is defined partially through the anti-rotation spacer 48, or through the recessed portion 104 when the recessed portion 104 is defined completely through the anti-rotation spacer 48. The recessed portion 104 may be defined by all or a portion of the engagement surface 68, and the retaining ring 50 may be engageable with the engagement surface 68 to limit rotation of the retaining ring 50 relative to the anti-rotation spacer 48.

Figure 14:
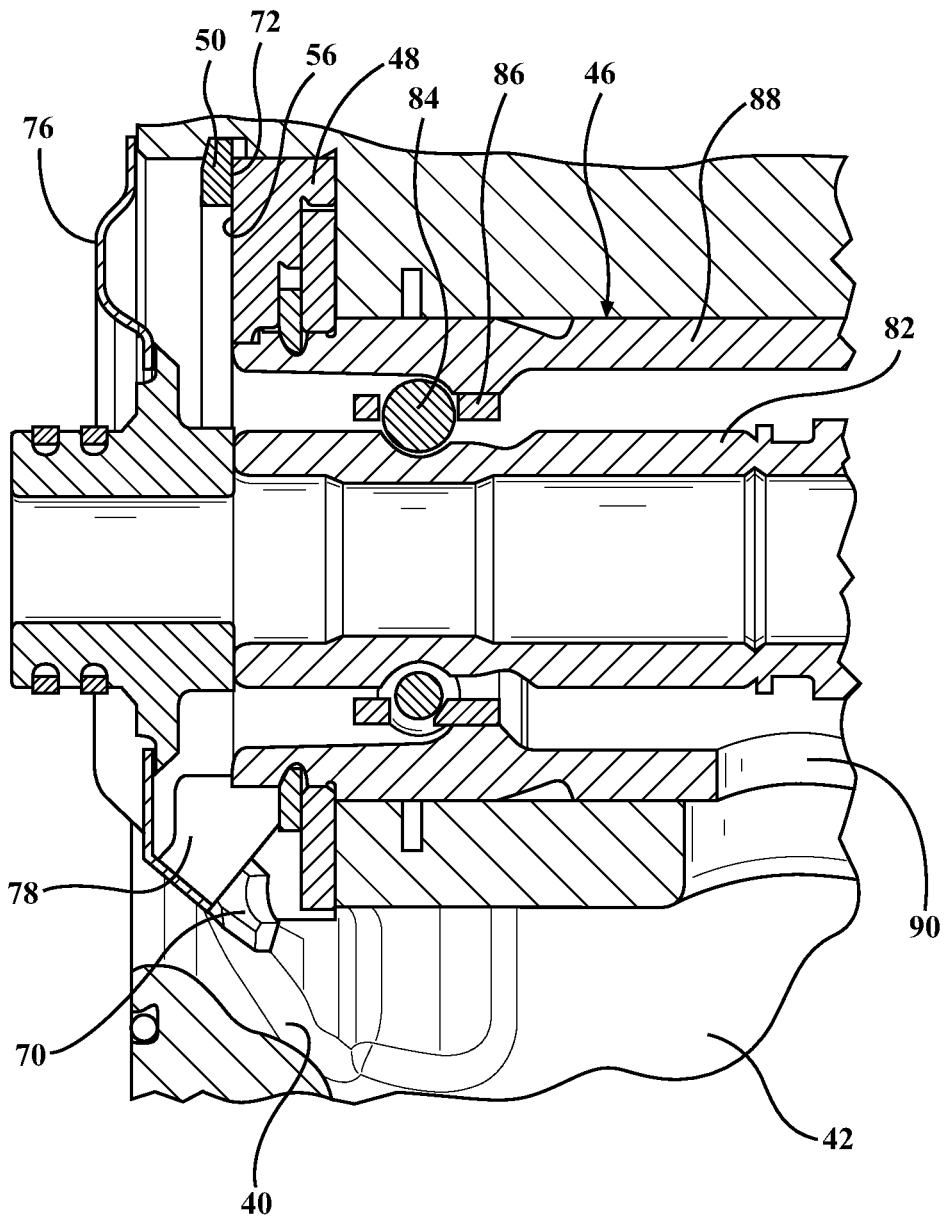
FIG. 14 is a cross-sectional view of the bearing housing assembly taken along line 6-6 of FIG. 3, with the retaining ring having a retaining surface facing the anti-rotation spacer, and with the retaining ring protruding portion extending from the retaining surface toward the engagement surface of the anti-rotation spacer.
Figure 15:
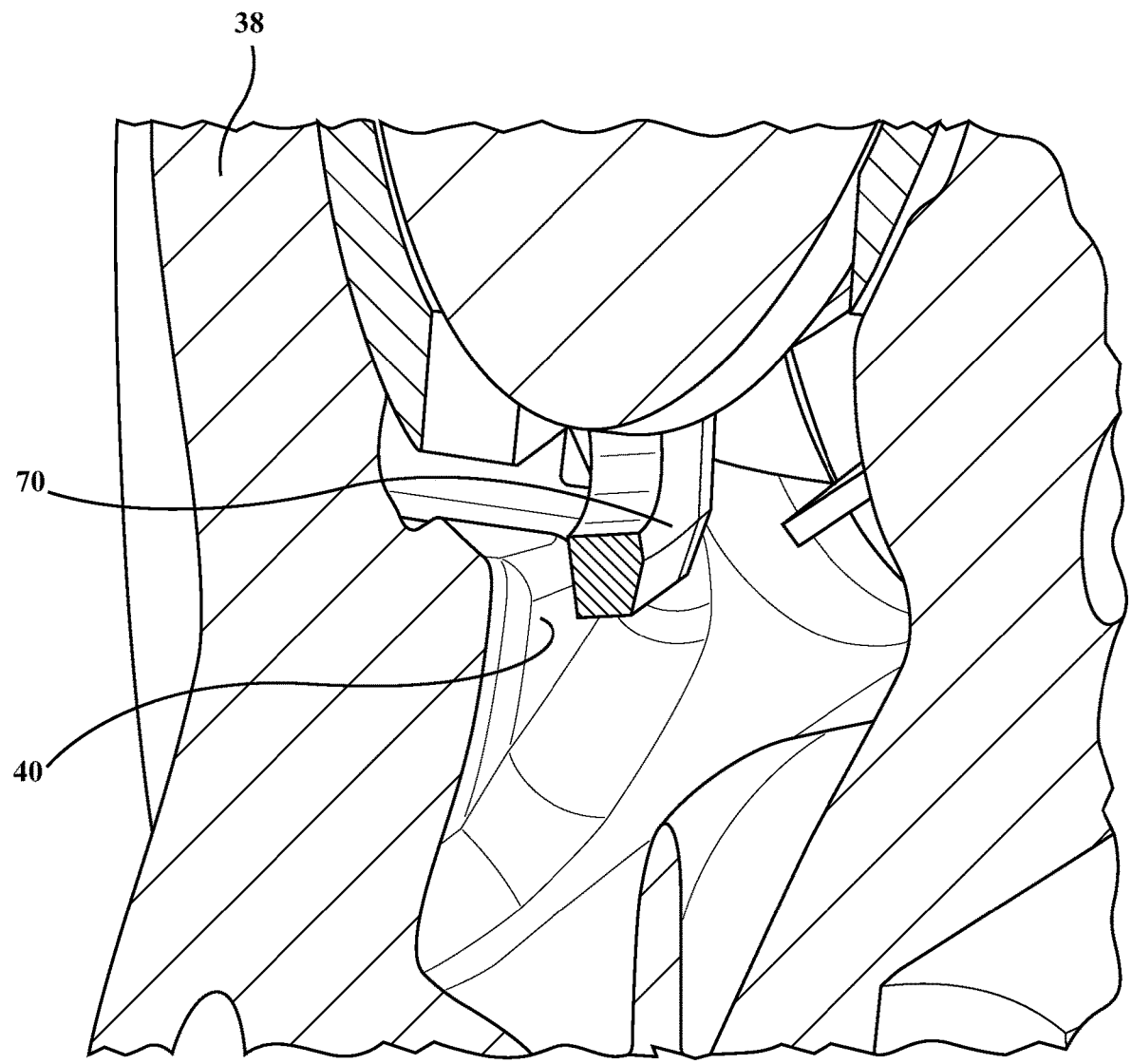
FIG. 15 is a perspective view of the bearing housing assembly shown partly in cross-sectional view, with the retaining ring protruding portion engageable with the bearing housing.

In some embodiments, the retaining ring protruding portion 70 may be engageable with the bearing housing 38 and may be configured to limit rotation of the retaining ring 50 relative to the bearing housing 38, as shown in FIGS. 14-16. In one embodiment, the retaining ring protruding portion 70 may extend through the recessed portion 104 and may be engageable with the bearing housing 38 to limit rotation of the retaining ring 50 relative to the bearing housing 38, as shown in FIGS. 13 and 16. The interior surface 40, which the retaining ring protruding portion 70 may be engageable with, may be cast with the bearing housing 38 to reduce manufacturing costs of the bearing housing 38. It is to be appreciated, however, that the interior surface 40 which the retaining ring protruding portion 70 may be engageable with may also be manufactured through other methods, such as through machining, while still being able to be engaged by the retaining ring protruding portion 70.

Figure 6:
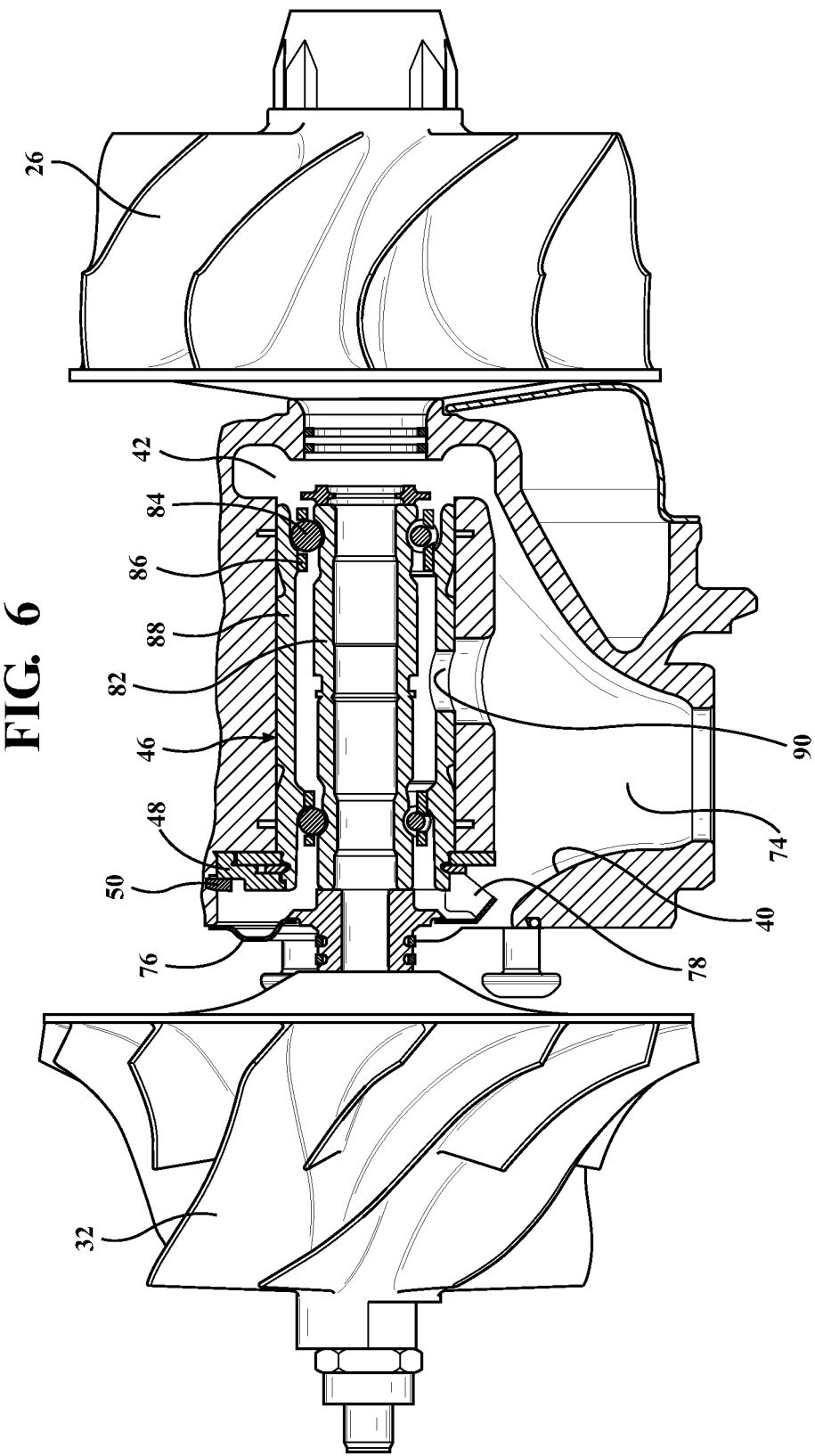
FIG. 6 is a cross-sectional view of the bearing housing assembly taken along line 6-6 of FIG. 3, with the bearing housing assembly including a lubricant deflector disposed about the shaft and coupled to the bearing housing.
Figure 7:
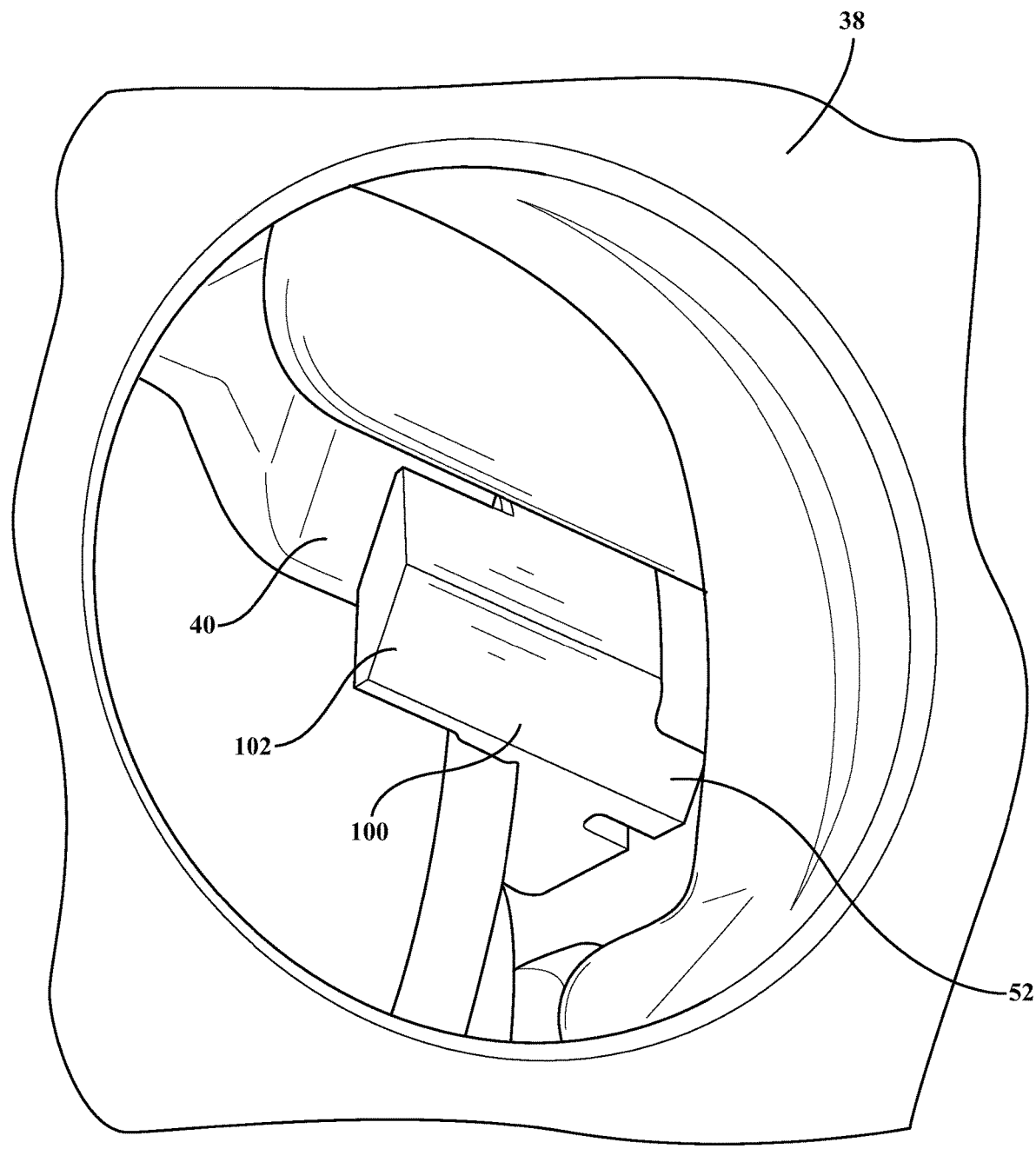
FIG. 7 is a perspective view of the bearing housing assembly, with the anti-rotation spacer having a second engagement member having a bearing housing protruding portion extending toward and engageable with the interior surface of the bearing housing.
Figure 8:
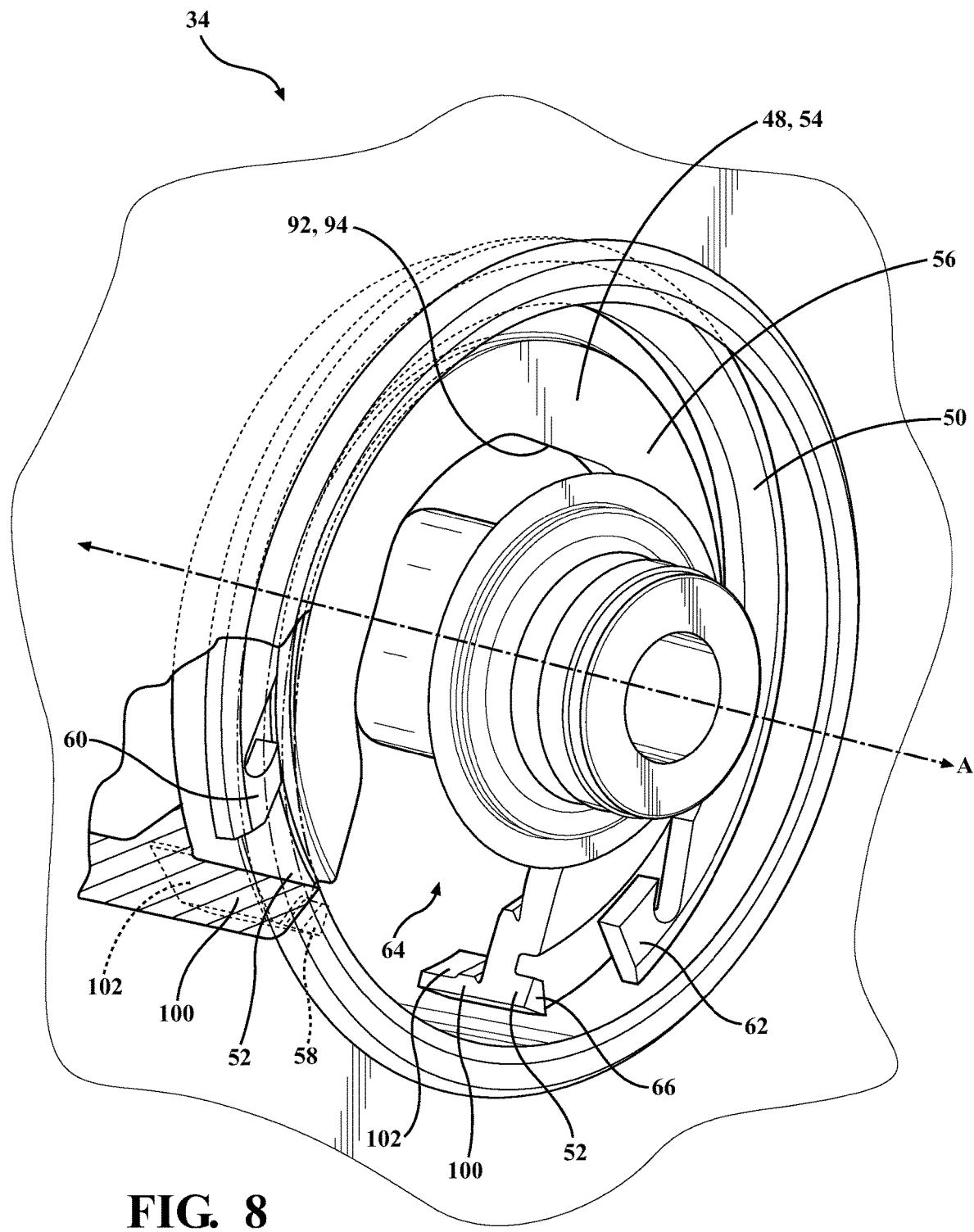
FIG. 8 is a perspective view of the bearing housing assembly, with the retaining ring and the anti-rotation spacer having the second engagement member shown partly in phantom, with the second engagement member having the bearing housing protruding portion extending toward and engageable with the interior surface of the bearing housing.
Figure 9:
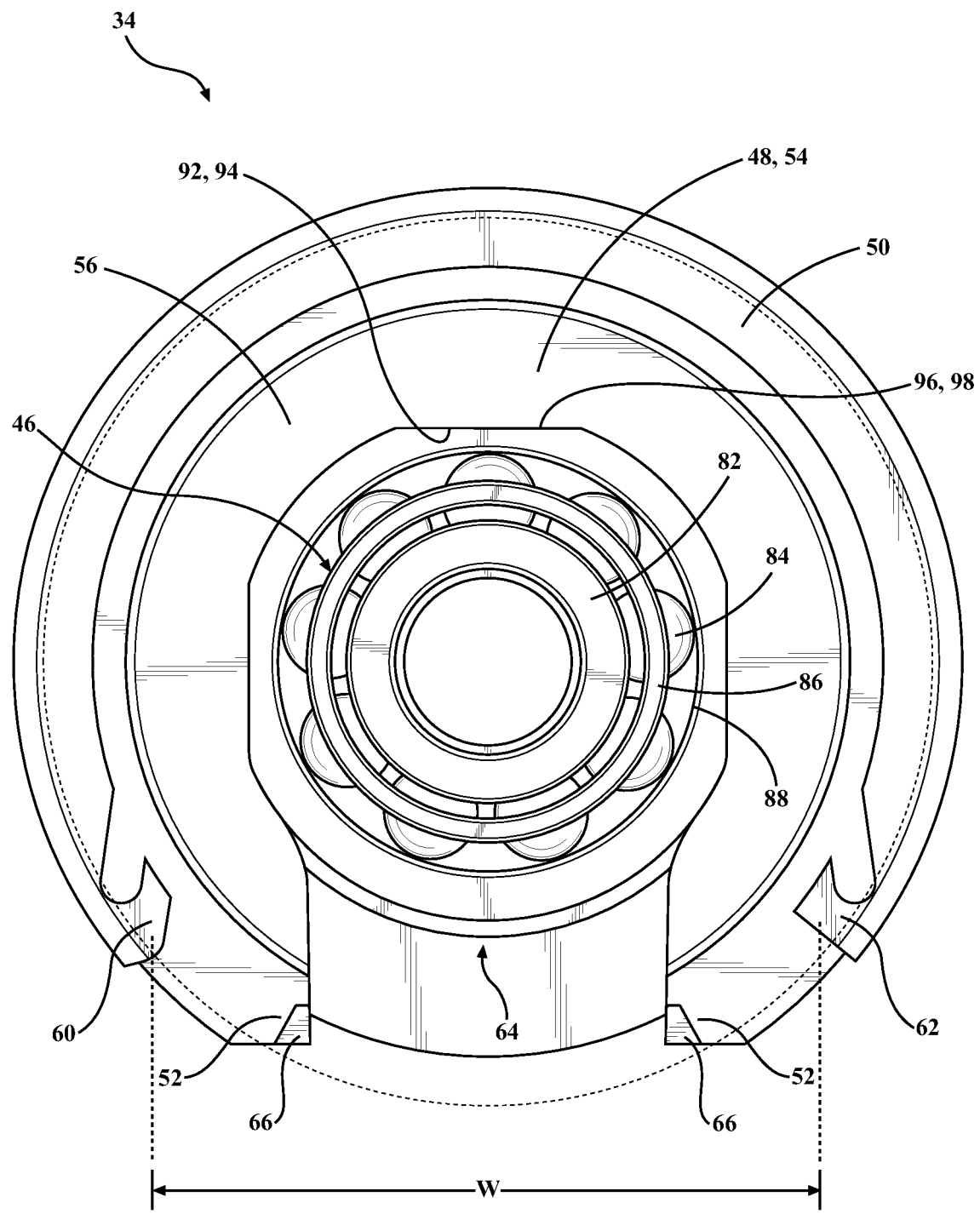
FIG. 9 is a front view of the bearing housing assembly, with the anti-rotation spacer having first and second ends, first and second protruding portions, and an inner surface having at least one non-round section, and with the bearing assembly having an outer race having an outer surface facing the inner surface of the anti-rotation spacer and having at least one engaging section engageable with the at least one non-round section, where the first and second ends of the retaining ring are spaced from the first and second protruding portions.
Figure 10:
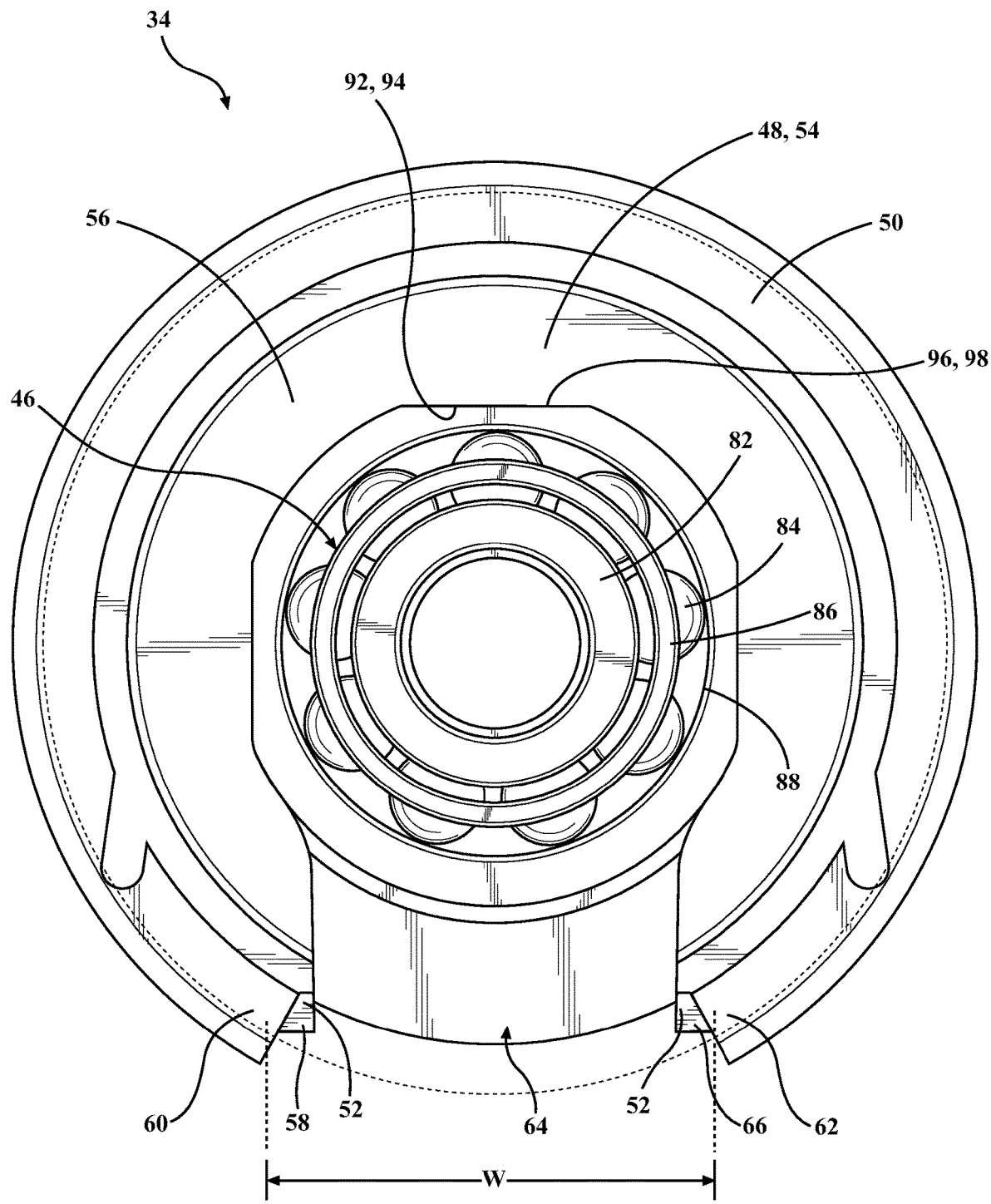
FIG. 10 is a front view of the bearing housing assembly, with the first and second ends of the anti-rotation spacer engaged with the first and second protruding portions.
Figure 11:
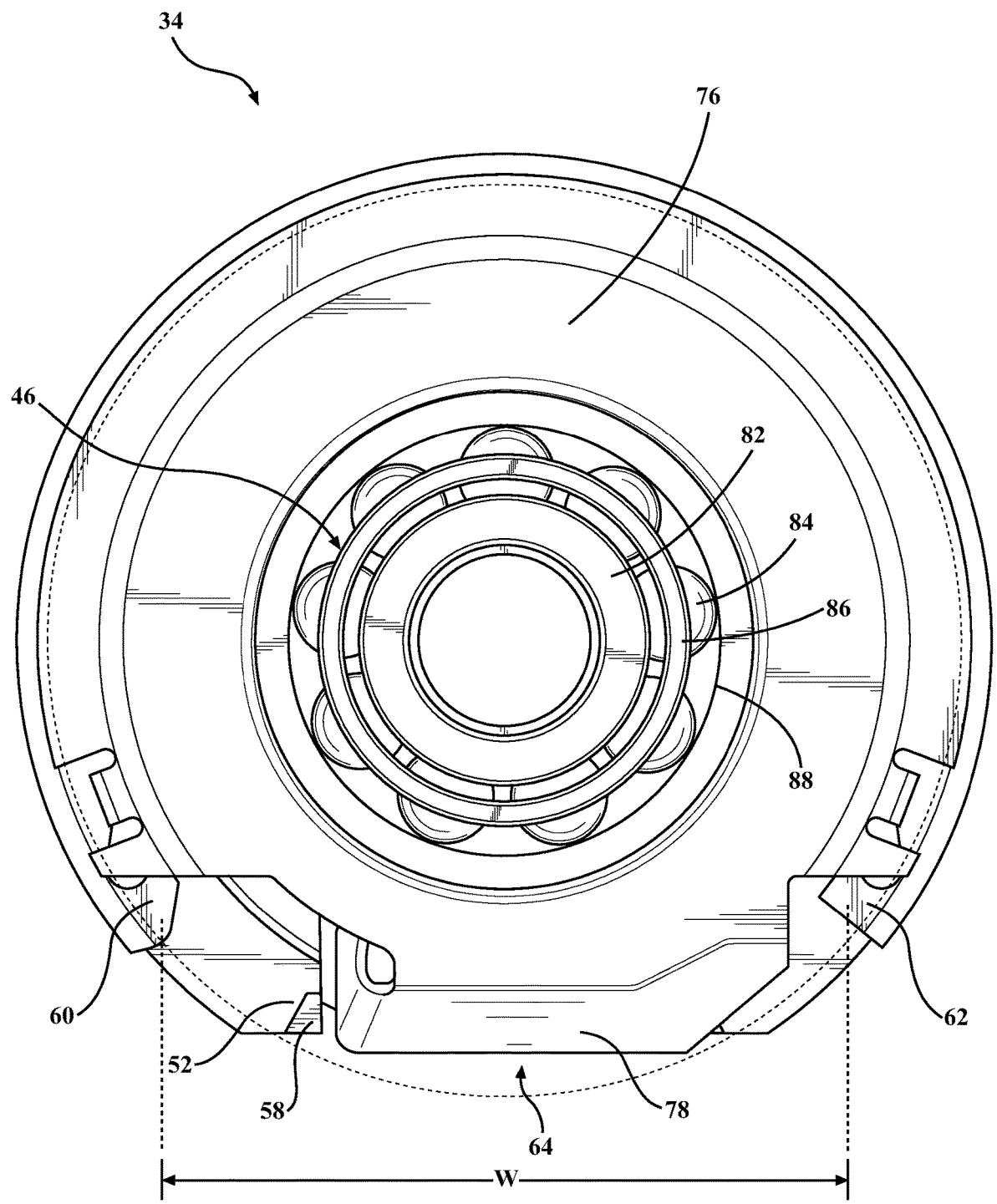
FIG. 11 is a front view of the bearing housing assembly having the lubricant deflector, with the first and second ends of the retaining ring defining a gap therebetween that is alignable with the lubricant sump and with the lubricant deflector, and with the lubricant deflector having a tongue that is alignable with the lubricant sump.
Figure 12:
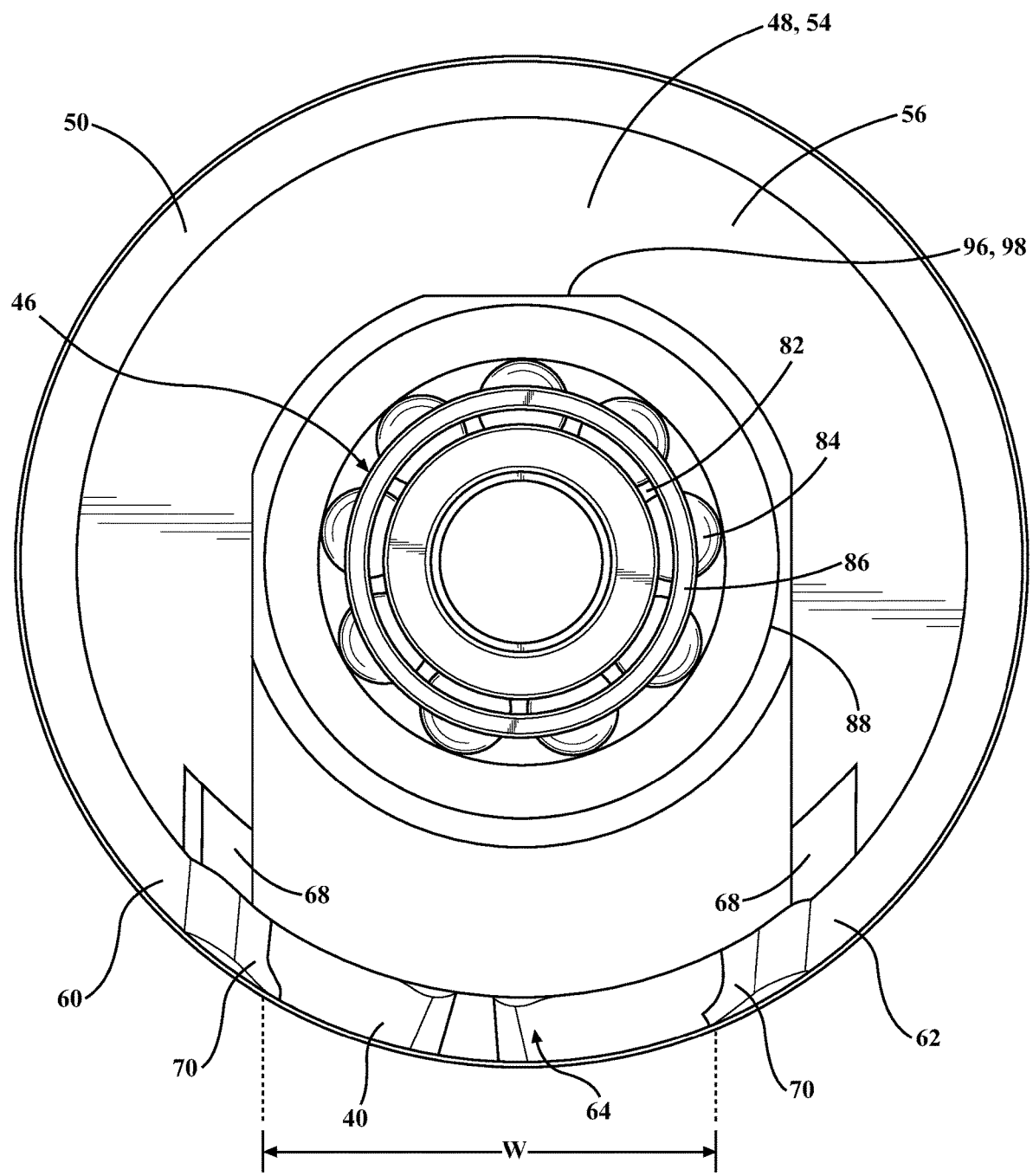
FIG. 12 is a front view of the bearing housing assembly, with the engagement member of the anti-rotation spacer having an engagement surface, with the retaining ring having a first end and a second end defining a gap therebetween, with the retaining ring having a retaining ring protruding portion extending from at least one of the first end and the second end of the retaining ring and toward the engagement surface, and with the retaining ring protruding portion engageable with the engagement surface.

The bearing housing 38 may define a lubricant sump 74 spaced radially from the bearing assembly 46 with respect to the longitudinal axis A, as shown in FIG. 6. Lubricant is typically utilized to lubricate the bearing housing assembly 34 and the lubricant is drainable into the lubricant sump 74. When present, the gap 64 defined between the first end 60 and the second end 62 of the retaining ring 50 may be alignable with the lubricant sump 74. The bearing housing assembly 34 may further include a lubricant deflector 76 disposed in the bearing housing interior 42 and coupled to the bearing housing 38. The gap 64 may be alignable with the lubricant deflector 76 such that the lubricant deflector 76 is able to deflect the lubricant toward the lubricant sump 74. The lubricant deflector 76 may have a tongue 78 extending toward the lubricant sump 74. The tongue 78 may extend toward the gap 64 between the first and second ends 60, 62, as best shown in FIGS. 6, 11 and 14.

Another advantage of the bearing housing assembly 34 is that the lubricant deflector 76 may direct lubricant toward the lubricant sump 74 without needing to be threaded into the bearing housing 38 or be manually aligned with the lubricant sump 74 during installation of the turbocharger 20 in the vehicle. Specifically, the tongue 78 of the lubricant deflector 76 may be engageable with the engagement member 52, the first protruding portion 58, and/or the second protruding portion 66 to limit rotation of the lubricant deflector 76 relative to the anti-rotation spacer 48. In this way, the rotation of the lubricant deflector 76 relative to the bearing housing 38 may be indirectly limited through engagement of the lubricant deflector 76 to the anti-rotation spacer 48. This allows the anti-rotation spacer 48 and the lubricant deflector 76 to remain in rotational position relative to one another and relative to the bearing housing 38 during rotation and alignment of the bearing housing 38 when clocking the turbocharger 20 in the vehicle.

The bearing assembly 46 may be any suitable bearing assembly for supporting rotation of the shaft 36. In one embodiment, the bearing assembly 46 may be a rolling element bearing (REB) cartridge. In such embodiments, as best shown in FIGS. 6 and 9-14, the REB cartridge may have an inner race 82 disposed about the shaft 36, a plurality of rolling elements 84 radially spaced from the inner race 82 away from the longitudinal axis A, an intermediary race 86 disposed about the rolling elements 84, and an outer race 88 radially spaced from the rolling elements 84 away from the longitudinal axis A. The rolling elements 84 may be each in contact with an inner track defined in the inner race 82 and an outer track defined in the outer race 88 to allow rotation of inner race 82 relative to the outer race 88. The rolling elements 84 may be ball bearings.

The outer race 88 may define a lubricant hole 90 through which lubricant may drain. The lubricant hole 90 may be alignable with the lubricant sump 74 to allow lubricant to drain through the lubricant hole 90 into the lubricant sump 74. The lubricant hole 90 may also be alignable with the lubricant deflector 76 such that the lubricant flows through the lubricant hole 90 and from the lubricant deflector 76 in the same direction. In a non-limiting example, the lubricant may flow through the lubricant hole 90 and from the lubricant deflector 76 toward the lubricant sump 74. The lubricant hole 90 may also be alignable with the tongue 78 of the lubricant deflector 76 such that the lubricant flows through the lubricant hole 90 and from the tongue 78 of the lubricant deflector 76 in the same direction. In a non-limiting example, the lubricant may flow through the lubricant hole 90 and from the tongue 78 of the lubricant deflector 76 toward the lubricant sump 74. This prevents an undesired accumulation of lubricant in the bearing housing 38.

In another embodiment, the anti-rotation spacer 48 may have an inner surface 92 configured to face the shaft 36. The inner surface 92 may have at least one non-round section 94, as shown in FIGS. 3-5, 9, 10 and 12. In such embodiments, the at least one non-round section 94 may deviate from a circle with constant radius about the longitudinal axis A. The non-round section 94 may be depicted as a flat section. It is to be appreciated that the non-round section may be any other suitable configuration, such as polygonal or oval. The outer race 88 of the bearing assembly 46 may have an outer surface 96 facing the inner surface 92 of the anti-rotation spacer 48 and having at least one engaging section 98 engageable with the at least one non-round section 94 to limit rotation of the outer race 88 of the bearing assembly 46 relative to the anti-rotation spacer 48. Specifically, the at least one engaging section 98 corresponds in configuration with the at least one non-round section 94. By way of example, the at least one engaging section 98 may be flat, polygonal, or oval.

In another embodiment, the engagement member 52 of the anti-rotation spacer 48 may further be defined as a first engagement member 52, and the anti-rotation spacer 48 may have a second engagement member 100 engageable with the interior surface 40 of the bearing housing 38 to limit rotation of the anti-rotation spacer 48 relative to the bearing housing 38, as shown in FIGS. 4, 5, and 8-10. The second engagement member 100 may have a bearing housing protruding portion 102 extending toward and engageable with the interior surface 40 of the bearing housing 38. The interior surface 40 which the second engagement member 100 is engageable with may be cast with the bearing housing 38 to reduce manufacturing costs of the bearing housing 38. It is to be appreciated, however, that the interior surface 40 which the second engagement member 100 is engageable with may also be manufactured through other methods, such as through machining, while still being able to be engaged by the second engagement member 100.

In embodiments where both the first engagement member 52 and the second engagement member 100 are present, both the first engagement member 52 and the second engagement member 100 limit rotation of the retaining ring 50 relative to the bearing housing 38. Specifically, the first engagement member 52 limits rotation of the anti-rotation spacer 48 relative to the retaining ring 50 and the second engagement member 100 limits rotation of the anti-rotation spacer 48 relative to the bearing housing 38. Therefore, in embodiments where both the first engagement member 52 and the second engagement member 100 are present, the first engagement member 52 and the second engagement member 100 limit rotation of the retaining ring 50 relative to the bearing housing 38 indirectly through the anti-rotation spacer 48. In particular, this allows the gap 64 defined between the first and second ends 60, 62 of the retaining ring 50 to be aligned with the lubricant sump 74. This further allows the anti-rotation spacer 48 and the retaining ring 50 to remain in rotational position relative to one another and relative to the bearing housing 38 during rotation and alignment of the bearing housing 38 when clocking the turbocharger 20 in the vehicle.

In embodiments where both the first engagement member 52 and the retaining ring protruding portion 70 are present, both the first engagement member 52 and the retaining ring protruding portion 70 limit rotation of the anti-rotation spacer 48 relative to the bearing housing 38. Specifically, the first engagement member 52 limits rotation of the anti-rotation spacer 48 relative to the retaining ring 50 and the retaining ring protruding portion 70 limits rotation of the retaining ring 50 both relative to the anti-rotation spacer 48 through engagement of the engagement surface 68 and relative to the bearing housing 38 through engagement of the interior surface 40. Therefore, in embodiments where both the first engagement member 52 and the retaining ring protruding portion 70 are present, the first engagement member 52 and the retaining ring protruding portion 70 limit rotation of the anti-rotation spacer 48 relative to the bearing housing 38 indirectly through the retaining ring 50. In particular, this allows the gap 64 defined between the first and second ends 60, 62 of the retaining ring 50 to be aligned with the lubricant sump 74. This further allows the anti-rotation spacer 48 and the retaining ring 50 to remain in rotational position relative to another and relative to the bearing housing 38 during rotation and alignment of the bearing housing 38 when clocking the turbocharger 20 in the vehicle.

Although the bearing housing assembly 34 is described above as being used in a turbocharger 20, it is to be appreciated that other uses exist for the bearing housing assembly 34, such as in turbo-machinery, compressor-machinery, or turbine-machinery. Similarly, although the anti-rotation assembly 44 is described above as being used in a turbocharger 20, it is to be appreciated that other uses exist for the anti-rotation assembly 44, such as in turbo-machinery, compressor-machinery, or turbine-machinery. Similarly to the bearing housing assembly 34 and the anti-rotation assembly 44, although the anti-rotation spacer 48 is described above as being used in a turbocharger 20, it is to be appreciated that other uses exist for the anti-rotation spacer 48, such as in turbo-machinery, compressor-machinery, or turbine machinery.

It is to be appreciated that various components of the turbocharger 20 and dimensions of the various components of the turbocharger 20 are merely illustrative and may not be drawn to scale. The invention has been described in an illustrative manner, and it is to be understood that the terminology which has been used is intended to be in the nature of words of description rather than of limitation.

Many modifications and variations of the present invention are possible in light of the above teachings, and the invention may be practiced otherwise than as specifically described.

What is claimed is:

1. A turbocharger comprising:
a turbine housing defining a turbine housing interior;
a turbine wheel disposed in said turbine housing interior;
a compressor housing defining a compressor housing interior;
a compressor wheel disposed in said compressor housing interior;
a shaft disposed in said turbine housing interior and said compressor housing interior, with said shaft extending along a longitudinal axis and coupled to and rotatable with said turbine wheel and said compressor wheel, and
a bearing housing assembly comprising,
a bearing housing extending along said longitudinal axis, with said bearing housing having an interior surface defining a bearing housing interior, and
an anti-rotation assembly comprising,
a bearing assembly disposed in said bearing housing interior and disposed about said shaft, said bearing assembly supporting rotation of said shaft,
an anti-rotation spacer disposed in said bearing housing interior and disposed about said shaft, and
a retaining ring disposed about said shaft and coupled to said anti-rotation spacer to axially retain said anti-rotation spacer in said bearing housing interior;
wherein said anti-rotation spacer has an engagement member engageable with said retaining ring and configured to limit rotation of said retaining ring relative to said anti-rotation spacer,
wherein said engagement member has an engagement surface, and wherein said retaining ring has a retaining ring protruding portion extending axially with respect to said longitudinal axis toward and engageable with said engagement surface of said anti-rotation spacer to limit rotation of said retaining ring relative to said anti-rotation spacer.

2. The turbocharger as set forth in claim 1, wherein:
said anti-rotation spacer has a second engagement member engageable with said bearing housing and configured to limit rotation of said anti-rotation spacer relative to said bearing housing; and
said anti-rotation spacer has an inner surface facing said shaft, with said inner surface having at least one non-round section, wherein said bearing assembly comprises an outer race disposed about said longitudinal axis and having an outer surface facing said inner surface of said anti-rotation spacer, with said outer surface having at least one engaging section engageable with said at least one non-round section to limit rotation of said outer race of said bearing assembly relative to said anti-rotation spacer.

3. The turbocharger as set forth in claim 1, wherein said retaining ring has a retaining surface perpendicular to said longitudinal axis and facing said anti-rotation spacer, and wherein said retaining ring protruding portion extends from said retaining surface.

4. The turbocharger as set forth in claim 1, wherein said retaining ring has a first end and a second end circumferentially spaced from said first end, wherein said first and second ends define a gap therebetween, and wherein said retaining ring protruding portion extends from at least one of said first and said second ends of said retaining ring and is engageable with said engagement surface of said anti-rotation spacer to limit rotation of said retaining ring relative to said anti-rotation spacer.

5. The turbocharger as set forth in claim 1, wherein said anti-rotation spacer has a recessed portion defined by said engagement surface, with said recessed portion being configured to receive said retaining ring protruding portion.

6. The turbocharger as set forth in claim 5, wherein said recessed portion is defined completely through said anti-rotation spacer with respect to said longitudinal axis.

7. A bearing housing assembly comprising:
a bearing housing extending along a longitudinal axis, with said bearing housing having an interior surface defining a bearing housing interior configured to receive a shaft; and
an anti-rotation assembly comprising,
a bearing assembly disposed in said bearing housing interior and configured to be disposed about the shaft, with said bearing assembly being configured to support rotation of the shaft,
an anti-rotation spacer disposed in said bearing housing interior and configured to be disposed about the shaft, and
a retaining ring configured to be disposed about the shaft and coupled to said anti-rotation spacer to axially retain said anti-rotation spacer in said bearing housing interior;
wherein said anti-rotation spacer has an engagement member engageable with said retaining ring and configured to limit rotation of said retaining ring relative to said anti-rotation spacer,
wherein said engagement member has an engagement surface, and wherein said retaining ring has a retaining ring protruding portion extending axially with respect to said longitudinal axis toward and engageable with said engagement surface of said anti-rotation spacer to limit rotation of said retaining ring relative to said anti-rotation spacer.

8. The bearing housing assembly as set forth in claim 7, wherein said retaining ring has a first end and a second end circumferentially spaced from said first end, wherein said first and second ends defining a gap therebetween, wherein said bearing housing defines a lubricant sump spaced radially from said bearing assembly with respect to said longitudinal axis into which a lubricant of said bearing assembly is drainable, and wherein said gap defined between said first end and said second end of said retaining ring is alignable with said lubricant sump.

9. The bearing housing assembly as set forth in claim 8, further comprising a lubricant deflector disposed in said bearing housing and coupled to said bearing housing, wherein said gap is alignable with said lubricant deflector such that said lubricant deflector is able to deflect the lubricant into said lubricant sump.

10. The bearing housing assembly as set forth in claim 7, wherein said anti-rotation spacer has an inner surface configured to face the shaft, with said inner surface having at least one non-round section, and wherein said bearing assembly comprises an outer race disposed about said longitudinal axis and having an outer surface facing said inner surface of said anti-rotation spacer, with said outer surface having at least one engaging section engageable with said at least one non-round section to limit rotation of said outer race of said bearing assembly relative to said anti-rotation spacer.

11. The bearing housing assembly as set forth in claim 7, wherein said engagement member is further defined as a first engagement member, and wherein said anti-rotation spacer has a second engagement member engageable with said interior surface of said bearing housing to limit rotation of said anti-rotation spacer relative to said bearing housing.

12. The bearing housing assembly as set forth in claim 11, wherein said second engagement member has a bearing housing protruding portion extending toward and engageable with said interior surface of said bearing housing.

13. The bearing housing assembly as set forth in claim 7, wherein said retaining ring has a retaining surface perpendicular to said longitudinal axis and facing said anti-rotation spacer, and wherein said retaining ring protruding portion extends from said retaining surface.

14. The bearing housing assembly as set forth in claim 7, wherein said retaining ring has a first end and a second end circumferentially spaced from said first end, wherein said first and second ends define a gap therebetween, and wherein said retaining ring protruding portion extends from at least one of said first and said second ends of said retaining ring and are engageable with said engagement surface of said anti-rotation spacer to limit rotation of said retaining ring relative to said anti-rotation spacer.

15. The bearing housing assembly as set forth in claim 14, wherein said retaining ring protruding portion is engageable with said bearing housing and configured to limit rotation of said retaining ring relative to said bearing housing.

16. The bearing assembly as set forth in claim 7, wherein said anti-rotation spacer has a recessed portion defined by said engagement surface, with said recessed portion being configured to receive said retaining ring protruding portion.

17. The turbocharger as set forth in claim 16, wherein said recessed portion is defined completely through said anti-rotation spacer with respect to said longitudinal axis.

18. An anti-rotation assembly for use in a bearing housing assembly, with the bearing housing assembly including a bearing housing having an interior surface defining a bearing housing interior configured to receive a shaft, said anti-rotation assembly comprising:
a bearing assembly extending along a longitudinal axis, and configured to be disposed in the bearing housing interior and configured to support rotation of the shaft;
an anti-rotation spacer disposed about said longitudinal axis, and configured to be disposed in the bearing housing interior and to be coupled to the bearing housing; and
a retaining ring disposed about said longitudinal axis and coupled to said anti-rotation spacer;
wherein said anti-rotation spacer has an engagement member engageable with said retaining ring and configured to limit rotation of said retaining ring relative to said anti-rotation spacer,
wherein said engagement member has an engagement surface, and wherein said retaining ring has a retaining ring protruding portion extending axially with respect to said longitudinal axis toward and engageable with said engagement surface of said anti-rotation spacer to limit rotation of said retaining ring relative to said anti-rotation spacer.

19. The anti-rotation assembly as set forth in claim 18, wherein said anti-rotation spacer has a recessed portion defined by said engagement surface, with said recessed portion being configured to receive said retaining ring protruding portion.

20. The turbocharger as set forth in claim 19, wherein said recessed portion is defined completely through said anti-rotation spacer with respect to said longitudinal axis.

* * * * *